Patented Dec. 10, 1935

2,023,615

UNITED STATES PATENT OFFICE 2,023,615

GREEN AZO DYESTUFFS AND PROCESS OF MAKING SAME

William Galloway Reid, Derby, England, assignor to Imperial Chemical Industries Limited, a corporation of Great Britain No Drawing. Application November 25, 1932, Serial No. 644,277. In Great Britain March 19, 1931

10 Claims. (Cl. 260—76)

This invention relates to the manufacture of dyed articles and it comprises processes of making such articles wherein the material to be dyed is impregnated with a diacylacetyldiamino compound and the impregnated material is treated with a diazotized aminoaryleneaminoanthraquinone compound; and it further comprises dyed materials having green shades obtained by the formation of the dye in situ; all as more fully hereinafter set forth and as claimed.

This case is a continuation in part of application No. 536,665, filed May 11, 1931.

It is known that yellow, orange and brown water-insoluble azo dyes and dyeings on vegetable fibers may be obtained by combining, in substance or on the fiber, a diazotized amine and an diacylacetyldiamino compound (compare Patent No. 1,505,569), but hues other than those ranging from yellow to brown, have not heretofore been produced.

I have now discovered means by which such other hues or shades, particularly green shades, may be obtained.

By my present process I can produce green dyeings on textiles by the so-called "ice-color" process; the dyeings being of satisfactory fastness. Also I may produce a green water-insoluble dyestuff in substance.

In my process, I obtain these green water insoluble dyes by reacting a diacylacetyldiamino compound with a diazotized aminoaryleneaminoanthraquinone compound. The diacylacetyldiamino compound may be represented by the probable formula:

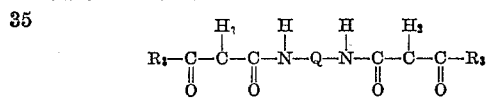

wherein $R_3$ represents a hydrocarbon radical and Q represents structure of the class consisting of —R—, —R—R—, and —R—X—R—, wherein R represents a para-arylene nucleus and X represents a connecting linkage. $R_3$ may be a hydrocarbon radical such as an alkyl group (methyl, ethyl, etc.) or a benzene nucleus (phenyl). The connecting linkage represented by X may be a linkage of the class consisting of

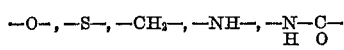

and

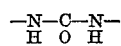

Also the linkage represented by X may be a direct linkage between the arylene nuclei giving the structure represented above as —R—R—. I have found that compounds containing this direct linkage between the arylene nuclei, are advantageous both in my process and in the products produced. For instance, compounds represented by the following formula:

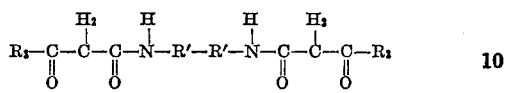

wherein R' represents a para-phenylene nucleus and $R_3$ represents an alkyl or benzene nucleus, are advantageous.

The aminoaryleneaminoanthraquinone compounds may be represented by the following formula:

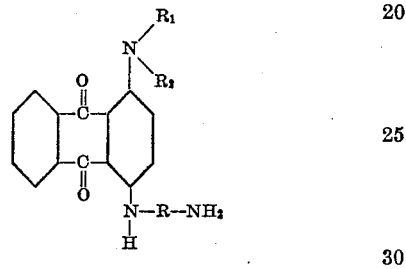

wherein $R_1$ represents an alkyl group, an aralkyl or aryl nucleus, $R_2$ represents hydrogen, an alkyl group, an aralkyl or benzene nucleus, and in which $R_1$ and $R_2$ may be cross linked to form a polymethylene ring and R represents a para-arylene nucleus. I find that such anthraquinone compound as may be represented by the following formula:

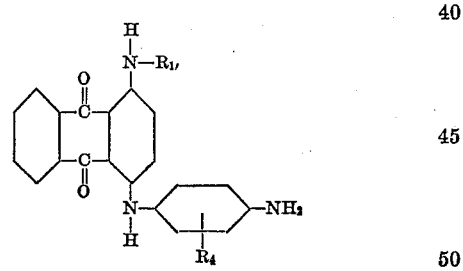

wherein $R_{1'}$ represents an alkyl group and $R_4$ represents hydrogen, chlorine, an alkyl or alkoxy group, are advantageous.

The new azo dyestuffs obtained by my processes may be represented by the following generic formula:

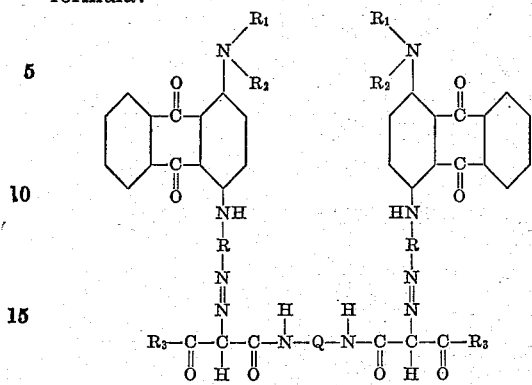

wherein the various symbols have the same significance, as heretofore generically set forth. Within this generic class there are many subgeneric classes, a few of which are represented by the following structural formulæ:

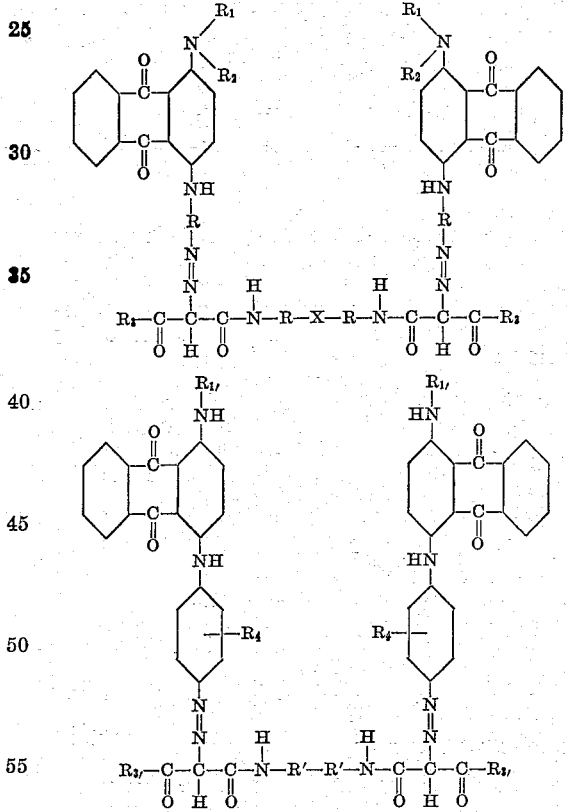

wherein $R_{1'}$ represents an alkyl group, $R_{3'}$ represents an alkyl group or benzene nucleus, $R'$ represents a para-phenylene nucleus and $R_4$ represents hydrogen, chlorine, an alkyl or an alkoxy group. Preferably they are produced directly on the fiber by the general methods customary in the so-called "ice-color" process. The dyeings so obtained, in accordance with the invention, are distinguished by pure green shades. They have outstanding fastness to washing and treatment with alkalies, as is shown when the kier-boiling test described below is applied. The dyeings also have very good light fastness and are fast also to perspiration and rubbing.

In order better to disclose the invention I give several specific embodiments thereof below. It is to be understood that these examples are purely illustrative and that the invention is in no way limited thereto.

*Example 1*

Cotton yarn is impregnated by working for 30 minutes at 30° C. in a solution containing 3 grams per litre of diaceto-acetyl-o-tolidide with the addition of 14 grams per litre of common salt, squeezed and passed into a diazo solution obtained as described below, diluted with water until there is 4 parts of diazonium compound in 1000 parts of solution. The yarn is immediately dyed green. The dyed yarn is rinsed and finally soaped for ½ hour at the boil in a bath containing 3 grams soap and 2 grams soda ash per litre. A bright green shade of great fastness to washing, kier-boiling, etc., is produced.

The diazo solution is obtained by dissolving 34.3 parts of 1-methylamino-4-p-aminoanilino-anthraquinone:

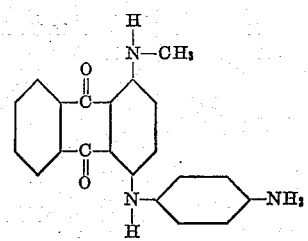

in 200 parts of sulfuric acid of 96 per cent strength, adding 600 parts of ice and 6.9 parts of sodium nitrite dissolved in 50 parts of water. When all the nitrite is introduced, water is added until all the diazonium salt is dissolved, a deep green solution being obtained. The parts above are by weight.

*Example 2*

A diazonium solution is prepared in the manner described in the preceding example and is filtered if necessary. It is run into a solution of 20 parts of diacetoacetyl-o-tolidide in 1000 parts of water containing 8 parts of sodium hydroxide, all the parts being by weight. The mixture is stirred overnight, then heated to 90° C. and the precipitated insoluble dyestuff filtered and well washed with cold water. When dry it forms a dark green or black powder dissolving in concentrated sulfuric acid to give a bright green solution, which on addition of water becomes olive green and gives an olive green precipitate. The dyestuff is sparingly soluble in benzene to a clear green solution. The dyestuff gives a green lake pigment when mixed with or prepared in presence of the usual substrata.

*Example 3*

Cotton yarn is impregnated as described in Example 1. It is then passed into a diazo solution containing a diazonium compound prepared as described in Example 1 from the compound:

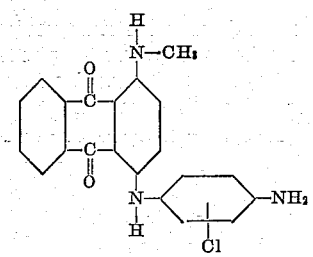

(obtained according to the method referred to below by use of 2-chloro-p-phenylenediamine instead of p-phenylenediamine). A similar bright green shade is produced and the washing and other fastness properties are alike excellent.

Similar dyeings are obtained when there are used as parents of the diazonium compound the compounds represented by the following formulæ:

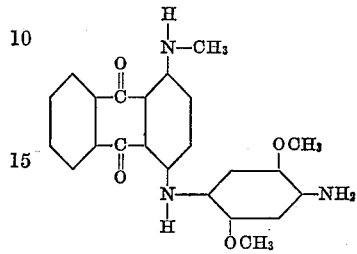 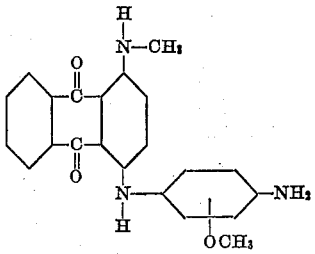 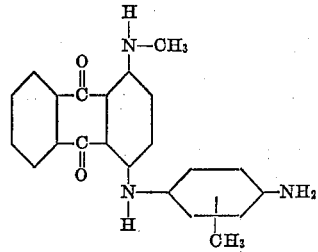

these compounds being producible by the method described in British specification No. 315,905.

Other compounds, for instance, those represented by the formulæ:

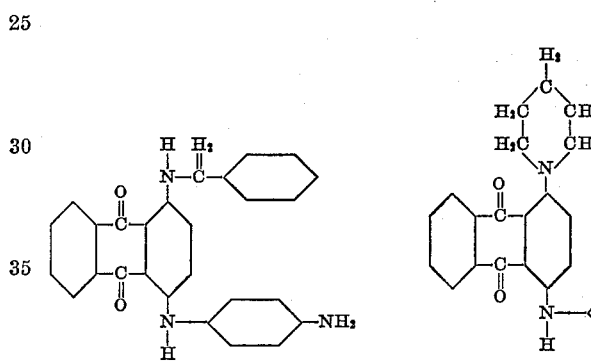 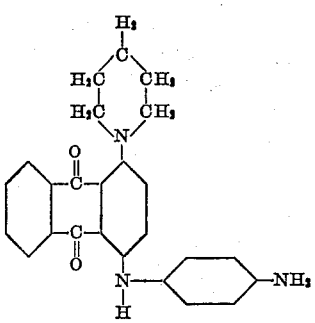

may also be used.

Likewise there may be used also as coupling components instead of diacetoacetyl-o-tolidide, diacetoacetyl-4,4'-diamino-benzophenone, diacetoacetyl- 4,4'-diaminodiphenylurea, diaceto-acetylbenzidine, diacetoacetyldianisidine, diacetoacetyl-4,4'-diaminostilbene, diacetoacetyl - 4,4' - diaminodiphenylmethane, dibenzoylacetyl-o-tolidide and the like.

That the dyeings obtained in accordance with the invention exhibit outstanding fastness to kier-boiling is shown when the test described by Rowe (cf. Journal of the Society of Dyers and Colourists, 1931, (February) page 33) is applied. The test is as follows:

One 5 gram skein of dyed cotton was plaited with one 5 gram skein of bleached cotton yarn and boiled for six hours in 100 cc. distilled water to which 0.8 cc. 73° Tw. caustic soda solution had been added (i. e. 100 cc. of 0.36 per cent caustic soda solution). Loss of water by evaporation is continually made up by dropping in boiling water. The plait is removed, rinsed thoroughly in running water, and dried.

The fiber may also be dyed in the novel way by printing a diazo solution upon a padded fabric in the usual manner.

As many apparently widely different embodiments of this invention may be made without departing from the spirit and scope thereof, it is to be understood that I do not limit myself to the specific embodiments thereof except as defined in the appended claims.

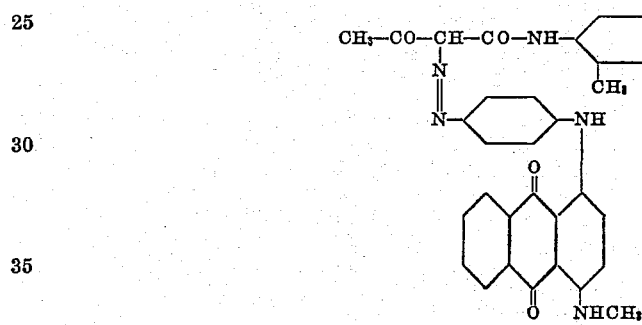

I claim:

1. A process for producing azo dyes which comprises coupling a diazotized amino-arylene-amino-anthraquinone compound with a diacyl-acetyl-diamino compound wherein the acylacetyl groups are substituted on separate amino groups.

2. A process for producing azo dyes which comprises coupling a diacyl-diamino compound of the following general formula:

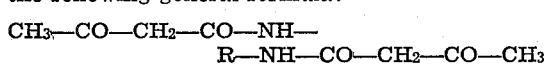

wherein R represents a diphenyl radical, with a diazotized amino-phenylene-amino-anthraquinone compound.

3. The process of claim 2 wherein the aminophenylene-amino-anthraquinone compound is a 1-methylamino-para-amino - phenylene - amino-anthraquinone compound.

4. A process for producing azo dyes which comprises coupling a diacyldiamino compound of the following general formula:

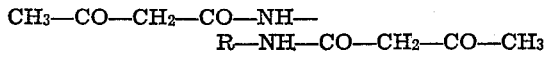

wherein R represents a phenyl radical or a diphenyl radical which may have substituted thereon an alkyl group, with a diazotized aminophenyleneaminoanthraquinone of the following formula:

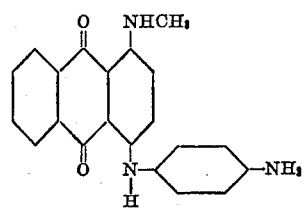

5. A process of producing green azo-dyestuffs which comprises diazotizing 1-methylamino-4(4'-aminophenyl)-amino anthraquinone and coupling the diazo compound thus obtained with diacetoacetyl-o-tolidide.

6. An azo dye having the following general formula:

wherein R' represents the radical of a diazotized amino-arylene-amino-anthraquinone compound, and X represents the residue of a diacyl-acetyl-diamino compound wherein the acyl-acetyl groups are substituted on separate amino groups.

7. An azo dye having the following general formula:

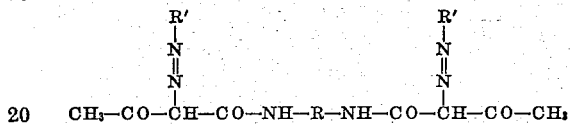

wherein R represents a diphenyl radical and R' represents the residue of a diazotized amino-phenylene-amino-anthraquinone compound.

8. An azo dye having the following general formula:

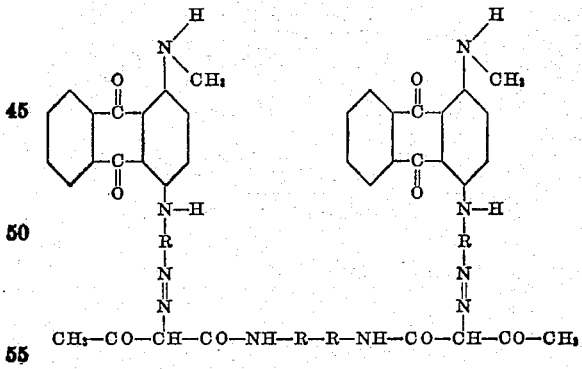

in which R represents a para-phenylene nucleus.

9. An azo dye having the following general formula:

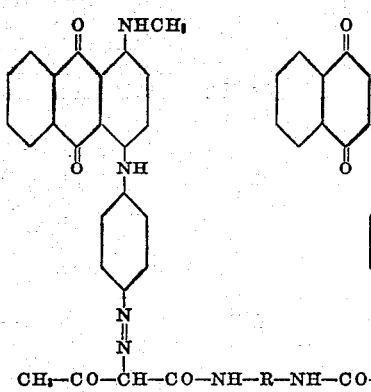

wherein R represents a phenyl radical or a diphenyl radical which may have substituted thereon an alkyl group.

10. The azo-dyestuff of the formula:

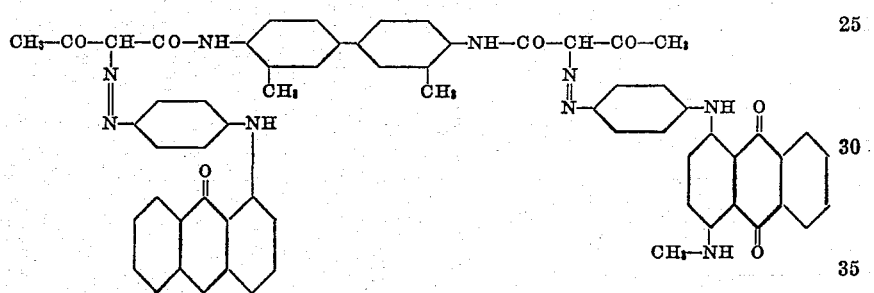

being insoluble in water and yielding, when produced on the fiber, green dyeings of good fastness properties.

WILLIAM GALLOWAY REID.